(12) United States Patent
Knox et al.

(10) Patent No.: US 9,608,806 B2
(45) Date of Patent: *Mar. 28, 2017

(54) EXTENDING DATA CONFIDENTIALITY INTO A PLAYER APPLICATION

(71) Applicant: Akamai Technologies, Inc., Cambridge, MA (US)

(72) Inventors: Christopher R. Knox, San Diego, CA (US); Alex Olugbile, San Diego, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/523,974

(22) Filed: Oct. 27, 2014

(65) Prior Publication Data

US 2015/0046714 A1 Feb. 12, 2015

Related U.S. Application Data

(63) Continuation of application No. 13/339,492, filed on Dec. 29, 2011, now Pat. No. 8,873,751.

(Continued)

(51) Int. Cl.
| | |
|---|---|
| *H04L 29/06* | (2006.01) |
| *H04L 9/08* | (2006.01) |
| *H04N 21/6334* | (2011.01) |
| *H04N 21/845* | (2011.01) |
| *H04N 21/266* | (2011.01) |
| *H04N 21/472* | (2011.01) |

(Continued)

(52) U.S. Cl.
CPC ............ *H04L 9/0819* (2013.01); *G06F 21/62* (2013.01); *H04L 9/0833* (2013.01); *H04L 9/14* (2013.01); *H04N 21/2347* (2013.01); *H04N 21/26606* (2013.01); *H04N 21/47202* (2013.01); *H04N 21/6334* (2013.01); *H04N 21/8456* (2013.01); *H04L 2209/24* (2013.01); *H04L 2209/60* (2013.01); *H04N 21/2181* (2013.01)

(58) Field of Classification Search
None
See application file for complete search history.

(56) References Cited

U.S. PATENT DOCUMENTS 7,590,237 B2 * 9/2009 Krause et al. .................. 380/37
8,401,187 B2 * 3/2013 Wajs et al. .................... 380/202
(Continued)

*Primary Examiner* — Benjamin Lanier
(74) *Attorney, Agent, or Firm* — David H. Judson

(57) ABSTRACT

In a content protection scheme, and in response to a request for a content segment received by a server, the server generates and associates with the segment a message that confers entitlement to a session-specific key from which one or more decryption keys may be derived. The decryption keys are useful to decrypt the segment at runtime as it is about to be rendered by a player. Before delivery, the server encrypts the segment to generate an encrypted fragment, and it then serves the encrypted fragment (and the message) in response to the request. At the client, information in the message is used to obtain the session-specific key. Using that key, the decryption keys are derived, and those keys are then used to decrypt the received encrypted fragment. The decryption occurs at runtime. The approach protects content while in transit to and at rest in the client browser environment.

9 Claims, 9 Drawing Sheets

Related U.S. Application Data

(60) Provisional application No. 61/428,893, filed on Dec. 31, 2010.

(51) Int. Cl.
*G06F 21/62* (2013.01)
*H04N 21/2347* (2011.01)
*H04L 9/14* (2006.01)
*H04N 21/218* (2011.01)

(56) References Cited

U.S. PATENT DOCUMENTS

2003/0221100 A1* 11/2003 Russ et al. ............... 713/153
2011/0010562 A1* 1/2011 Kill et al. ............... 713/189

* cited by examiner

EXTENDING DATA CONFIDENTIALITY INTO A PLAYER APPLICATION

BACKGROUND OF THE INVENTION

Technical Field

This application relates generally to delivery online of high definition (HD) video at broadcast audience scale to popular runtime environments and mobile devices.

Brief Description of the Related Art

Distributed computer systems are well-known in the prior art. One such distributed computer system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" means the storage, caching, or transmission of content, streaming media and applications on behalf of content providers, including ancillary technologies used therewith including, without limitation, DNS query handling, provisioning, data monitoring and reporting, content targeting, personalization, and business intelligence.

While content delivery networks provide significant advantages, typically they include dedicated platforms to support delivery of content for multiple third party runtime environments that are, in turn, based on their own proprietary technologies, media servers, and protocols. These distinct platforms are costly to implement and to maintain, especially globally and at scale as the number of end users increases. Moreover, at the same time, content providers (such as large-scale broadcasters, film distributors, and the like) desire their content to be delivered online in a manner that complements traditional mediums such as broadcast TV (including high definition or "HD" television) and DVD. This content may also be provided at different bit rates. End users also desire to interact with the content as they can do now with traditional DVR-based content delivered over satellite or cable. A further complication is that Internet-based content delivery is no longer limited to fixed line environments such as the desktop, as more and more end users now use mobile devices such as the Apple® iPhone® to receive and view content over mobile environments.

Thus, there is a need to provide an integrated content delivery network platform with the ability to deliver online content (such as HD-quality video) at broadcast audience scale to the most popular runtime environments (such as Adobe® Flash®, Microsoft® Silveright®, Apple® iOS®, etc.) as well as to mobile devices such as the iPhone to match what viewers expect from traditional broadcast TV. The techniques disclosed herein address this need.

BRIEF SUMMARY

A method of securing media extends data confidentiality into a player application within the context of an integrated HTTP-based delivery platform that provides for the delivery online of HD-video and audio quality content to popular runtime environments operating on multiple types of client devices in both fixed line and mobile environments. The technique is designed to fend off scalable attacks, such as attacks caused by link/token sharing and automatic update services, key sharing, transport level content decryption, copy at rest, and the like, without resort to digital rights management (DRM). The approach protects the content while in transit to and at rest in the client browser environment.

In one embodiment, the content is served from an edge network server to a requesting client browser having a media player. In particular, and in response to a request for a segment of content that is received by the edge network server, the server generates and associates with the segment an entitlement control message (ECM) that confers entitlement to a session-specific key from which one or more decryption keys are adapted to be derived. The segment of content typically represents a time slice of contiguous video and audio data of a configurable length at a discrete bitrate. Neither the session-specific key nor the decryption keys need to be included in the message itself. The decryption keys are adapted for use to decrypt the segment at runtime as the segment is about to be rendered by a client player. The edge network server encrypts the segment of content to generate an encrypted fragment, and it then serves the encrypted fragment (and the ECM, which may be embedded therein) in response to the request. At the client, information in the ECM (typically a token-protected URL) is used to obtain the session-specific key. Using that key, the one or more decryption keys are derived, and the decryption keys are then used to decrypt the received encrypted fragment. The decryption occurs at runtime as the segment is about to be rendered by the player code.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
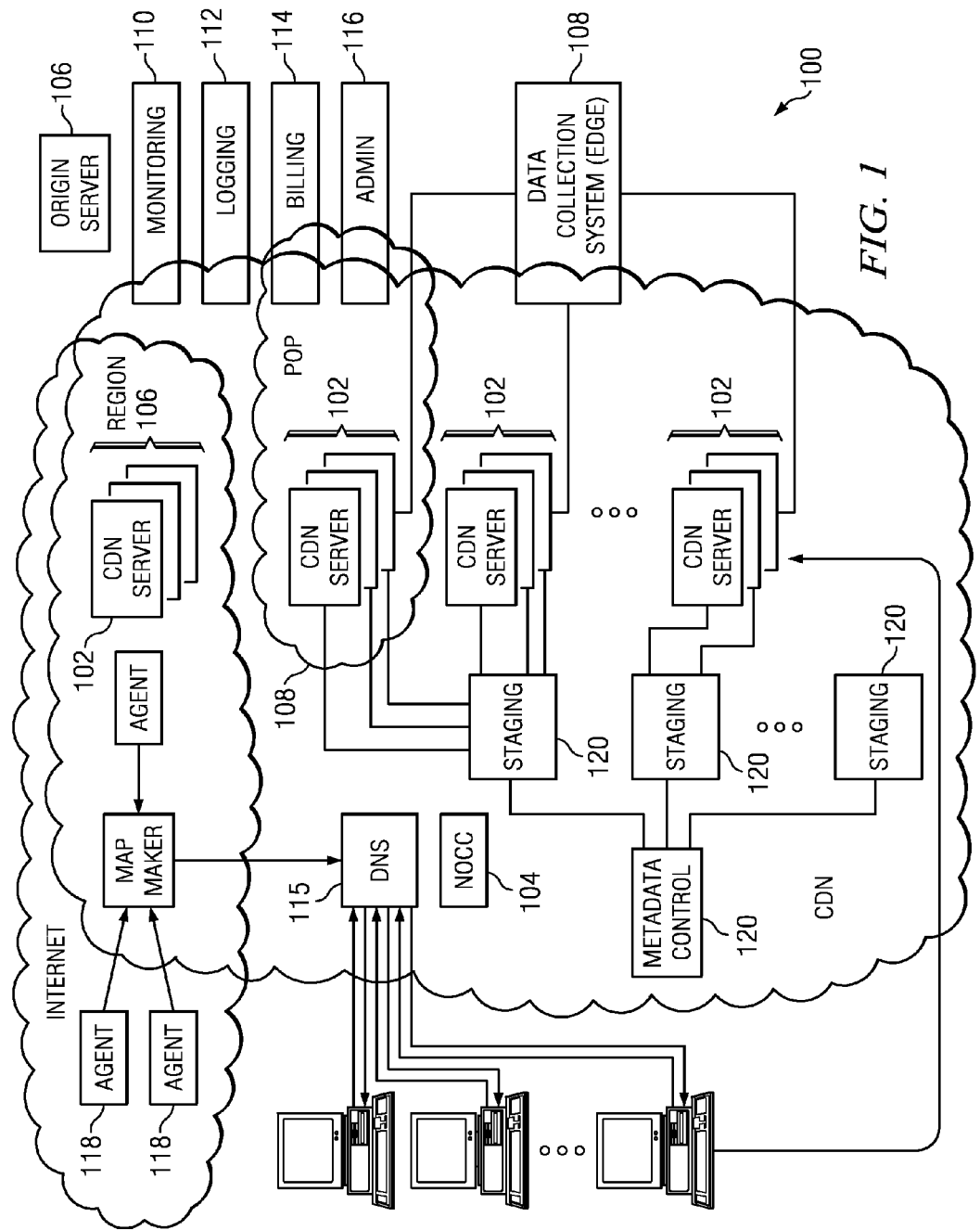
FIG. 1 depicts an exemplary block diagram of a distributed computer system environment in which exemplary aspects of the illustrative embodiments may be implemented.

FIG. 1 illustrates a known distributed computer system that (as described below) is extended by the techniques herein to provide a single HTTP-based platform with the ability to deliver online HD video at broadcast audience scale to the most popular runtime environments and to the latest devices in both fixed line and mobile environments.

In this representative embodiment, a distributed computer system 100 is configured as a content delivery network (CDN) and is assumed to have a set of machines 102a-n distributed around the Internet. Typically, most of the machines are servers located near the edge of the Internet, i.e., at or adjacent end user access networks. A network operations command center (NOCC) 104 may be used to administer and manage operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire such content may be directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
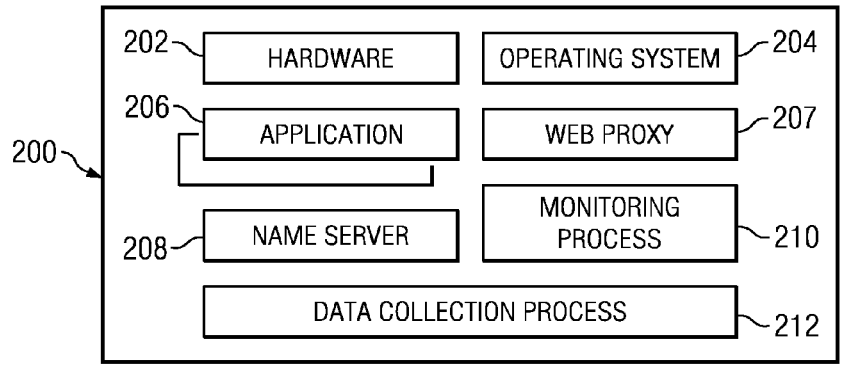
FIG. 2 is an exemplary block diagram of an edge server machine in the content delivery network in FIG. 1.

As illustrated in FIG. 2, a given machine 200 in the CDN (sometimes referring to herein as an "edge machine") comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207, a name server 208, a local monitoring process 210, a distributed data collection process 212, and the like. The HTTP proxy 207 comprises a cache, together with a manager process (sometimes referred to as a global host, or "ghost") for managing the cache and delivery of content from the edge machine. For streaming media, the machine typically includes one or more media servers, such as a Windows Media Server (WMS) or Flash 2.0 server, as required by the supported media formats. When configured as a CDN "edge" machine (or "edge server"), the machine shown in FIG. 2 may be configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information and this and other edge server control information (sometimes referred to as "metadata") can be provisioned by the CDN service provider itself, or (via an extranet or the like) the content provider customer who operates the origin server.

The CDN may include a storage subsystem (sometimes referred to herein as "Storage"), such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

For live streaming delivery, the CDN may include a live delivery subsystem, such as described in U.S. Pat. No. 7,296,082, the disclosure of which is incorporated herein by reference.

U.S. Publication No. 2011/0173345 describes how the above-identified technologies can be extended to provide an integrated HTTP-based delivery platform that provides for the delivery online of HD-video quality content to the most popular runtime environments and to the latest devices in both fixed line and mobile environments. The platform supports delivery of both "live" and "on-demand" content.

As described in U.S. Publication No. 2011/0173345, the following terms shall have the following representative meanings. For convenience of illustration only, the description that follows (with respect to live streaming delivery) is in the context of the Adobe Flash runtime environment, but this is not a limitation, as a similar type of solution may also be implemented for other runtime environments both fixed line and mobile (including, without limitation, Microsoft Silverlight, Apple iPhone, and others).

An Encoder is a customer-owned or managed machine which takes some raw live video feed in some format (streaming, satellite, etc.) and delivers the data to an Entry Point encoded for streaming delivery. An Entry Point (EP) typically is a process running on a CDN streaming machine which receives video data from the customer's Encoder and makes this data available to consumers of the live stream. For Adobe Flash, this is a Flash Media Server (FMS) configured to accept connections from Encoders. A Flash Media Server is a server process for Flash media available from Adobe Corporation. In this embodiment, an Intermediate Region (IR) typically is a Flash Media Server which the CDN has configured to act analogously to a streaming set reflector, such as described in U.S. Pat. No. 7,296,082 and U.S. Pat. No. 6,751,673. These machines relay streams from FMS EPs to FMS Edge regions, providing fan out and path diversity. A "Region" typically implies a set of machines (and their associated server processes) that are co-located and are interconnected to one another for load sharing, typically over a back-end local area network. A Flash Edge machine is a Flash Media Server which has been configured to accept client requests. This is the software running on the Flash EP, IR, and Edge machines in a representative embodiment. Intermediate Format (IF) is an internal (to the CDN) format for sending streaming data from EP to an edge server HTTP proxy. As will be described in more detail below, IF preferably comprises several different pieces, including "Stream Manifest," "Fragment Indexes," and "IF Fragments." Live, DVR and VOD are defined as follows: "Live" refers to media served in real time as an event occurs; "DVR" refers to serving content acquired from a "live" feed but served at a later time; "VOD" refers to media served from a single, complete (i.e., not incrementally changing) file or set of files. Real Time Messaging Protocol (RTMP) is the streaming and RPC protocol used by Flash. Real Time Messaging Protocol Encrypted (RTMPE) is the encrypted version of RTMP using secrets built into the server and client. "SWF" or "Small Web Format" is the format for Flash client applications. SWF verification refers to a technique by which the Flash Player can authenticate to FMS that it is playing an unmodified SWF by sending hashes of the SWF itself along with secrets embedded in the client and server.

Figure 3:
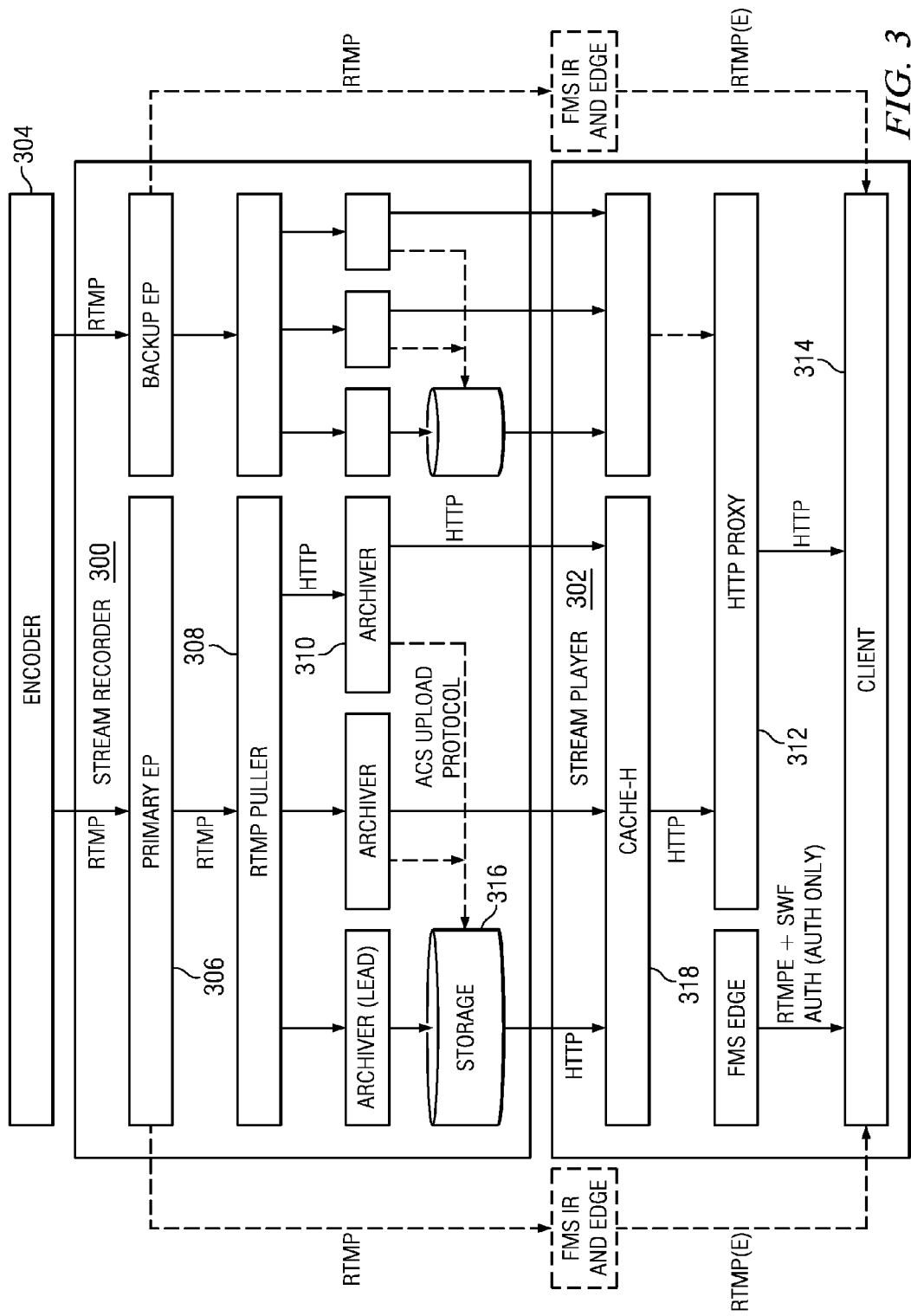
FIG. 3 illustrates an http-based content delivery architecture in which the secure media protection technique of this disclosure may be implemented.

FIG. 3 illustrates an overview of the architecture for live streaming delivery as described in U.S. Publication No. 2011/0173345. As seen in FIG. 3, the system generally is divided into two independent tiers: a stream recording tier 300, and a stream player tier 302. The recording process (provided by the stream recording tier 300) is initiated from the Encoder 304 forward. Preferably, streams are recorded even if there are currently no viewers (because there may be DVR requests later). The playback process (provided by the stream player tier 302) plays a given stream starting at a given time. Thus, a "live stream," in effect, is equivalent to a "DVR stream" with a start time of "now."

Referring to FIG. 3, the live streaming process begins with a stream delivered from an Encoder 304 to an Entry Point 306. An RTMP Puller component 308 (e.g., running on a Linux-based machine) in an EP Region (not shown) is instructed to subscribe to the stream on the EP 306 and to push the resulting data to one or more Archiver 310 processes, preferably running on other machines. As illustrated, one of the Archivers 310 may operate as the "leader" as a result of executing a leader election protocol across the archiving processes. Preferably, the Archivers 310 act as origin servers for the edge server HTTP proxy processes (one of which is shown at 312) for live or near-live requests. The edge server HTTP proxy 312 provides HTTP delivery to requesting end user clients, one of which is the Client 314. A "Client" is a device that includes appropriate hardware and software to connect to the Internet, that speaks at least HTTP, and that includes a content rendering engine. The Client device type will vary depending on whether the device connects to the Internet over a fixed line environment or a mobile environment. A representative client is a computer that includes a browser, typically with native or plug-in support for media players, codecs, and the like. If DVR is enabled, content preferably is also uploaded to the Storage subsystem 316, so that the Storage subsystem serves as the origin for DVR requests as will be described.

As also seen in FIG. 3, the content provider may choose to deliver two copies of the stream, a primary copy, and a backup copy, to allow the stream to continue with minimal interruption in the event of network or other problems. Preferably, the primary and backup streams are treated as independent throughout the system up through the edge server HTTP proxy, which preferably has the capability of failing over from the primary to the backup when the primary is having difficulties, and vice versa.

A content request (from an end user Client 314) is directed to the CDN edge machine HTTP proxy 312, preferably using techniques such as described in U.S. Pat. Nos. 6,108,703, 7,240,100, 7,293,093 and others. When an HTTP proxy 312 receives an HTTP request for a given stream, the HTTP proxy 312 makes various requests, preferably driven by HTTP proxy metadata (as described in U.S. Pat. Nos. 7,240,100, 7,111,057 and others), possibly via a cache hierarchy 318 (see, e.g., U.S. Pat. No. 7,376,716 and others) to learn about and download a stream to serve to the Client 314. Preferably, the streaming-specific knowledge is handled by the edge machine HTTP proxy 312 directly connected to a Client 314. Any go-forward (cache miss) requests (issued from the HTTP proxy) preferably are standard HTTP requests. In one embodiment, the content is delivered to the Client 314 from the HTTP proxy 312 as a progressive-download FLV file. As noted above, the references herein to Adobe FLV are used herein by way of example, as the architecture shown in FIG. 3 is not limited for use with Adobe FLV. For secure streams, preferably the Client 314 first authenticates to the HTTP proxy 312 using an edge server authentication technique and/or a SWF-verification back-channel.

When a Client 314 requests a particular stream, the HTTP proxy 312 (to which the client has been directed, typically via DNS) starts the streaming process by retrieving a "Stream Manifest" that contains preferably only slowly changing attributes of the stream and information needed by the HTTP proxy to track down the actual stream content. The URL to download this manifest preferably is constructed deterministically from metadata delivered (e.g., via the distributed data transport mechanism of FIG. 1) to the HTTP proxy. Preferably, the manifest itself is stored in association with a Stream Manifest Manager system (not shown) and/or in the storage subsystem 316. Preferably, a Stream Manifest describes the various "tracks" that compose a stream, where preferably each track constitutes a different combination of bit rate and type, where type is "audio," "video," or "interleaved_AV." The Stream Manifest preferably includes a sequence of "indexInfo" time ranges for each track that describe forward URL templates, stream properties, and various other parameters necessary for the HTTP proxy to request content for that time range.

For "live" requests, the HTTP proxy starts requesting content relative to "now," which, in general, is approximately equal to the time on the edge machine HTTP proxy process. Given a seek time, the HTTP proxy downloads a "Fragment Index" whose name preferably is computed based on information in the indexInfo range and an epoch seek time. Preferably, a Fragment Index covers a given time period (e.g., every few minutes). By consulting the Fragment Index, an "Intermediate Format (IF) Fragment" number and an offset into that fragment are obtained. The HTTP proxy can then begin downloading the file (e.g., via the cache hierarchy 318, or from elsewhere within the CDN infrastructure), skipping data before the specified offset, and then begin serving (to the requesting Client) from there. Preferably, the IF fragments are sized for optimal caching by the HTTP proxy. In general, and unless the Stream Manifest indicates otherwise with a new indexInfo range, for live streaming the HTTP proxy then continues serving data from consecutively-numbered IF Fragments.

In the context of live HTTP-based delivery, the Intermediate Format (IF) describes an internal representation of a stream used to get data from the RTMP Puller through to the edge machine HTTP proxy. A "source" format (SF) is a format in which the Entry Point 306 provides content and a "target" format (TF) is a format in which edge machine HTTP proxy 312 delivers data to the Client 314. These formats need not be the same. Thus, SF may differ from TF, i.e., a stream may be acquired in FLV format and served in a dynamic or adaptive (variable bit rate) format. The format is the container used to convey the stream; typically, the actual raw audio and video chunks are considered opaque data, although transcoding between different codecs may be implemented as well. By passing the formats through the HTTP proxy (and delivering to the Client via conventional HTTP), the container used to deliver the content can be changed as long as the underlying codecs are managed appropriately.

The above-described architecture is useful for live streaming, particularly over formats such as Flash. The platform can also be used to support Video on demand (VOD). In particular, the solution can provide VOD streaming from customer and Storage subsystem-based origins, provides single and multiple bitrate (SBR and MBR) streaming, provides support for origin content stored in flv and mp4/flv containers (supported mp4/flv codes include, among others, AAC, MP3, PCM for audio, and H.264 for video), and minimizes download of content beyond what is directly requested by the end user.

For VOD delivery, the stream recorder tier 300 (of FIG. 3) is replaced, preferably with a translation tier. For VOD delivery using HTTP, the Fragment Indexes may be generated from the origin content on-the-fly (e.g., by scanning FLV or parsing MP4 MOOV atoms) and caching these indexes. Actual data retrievals may then be implemented as "partial object caching" (POC) retrievals directly from source material at the edge region or via an intermediate translation (e.g., by a cache-h parent) into an Intermediate Format. Partial object caching refers to the ability of an HTTP proxy to fetch a content object in fragments only as needed rather than downloading the entire content object. The HTTP proxy can cache these fragments for future use rather than having to release them after being served from the proxy. An origin server from which the content object fragments are retrieved in this manner must support the use of HTTP Range requests.

As described in U.S. Publication No. 2011/0173345, typically VOD content is off-loaded for HTTP delivery to the CDN. In a first embodiment, a conversion tool (a script) is used to convert source content flv to IF, with the resulting IF files then uploaded to the Storage subsystem. In this approach, metadata is used to have an HTTP proxy go forward to the Storage subsystem to retrieve the stream manifest, which then references the Storage subsystem for the remaining content. In this approach, files in mp4/flv are first converted to flv (e.g., using ffmpeg copy mode) to change the container to fly. Another approach is to have a CDN customer upload raw media files to the Storage subsystem and to run a conversion tool there. Yet another alternative is to have the customer (or encoder) produce content in IF directly.

The translation tier approach is described in U.S. Publication No. 2011/0173345. In this approach, an on-demand dynamic IF generator machine takes requests for IF (manifests, indexes, and fragments) and satisfies these requests by dynamically retrieving flv or mp4/f4v input file ranges (either from the Storage subsystem or customer origin). From there, HTTP proxy treatment is essentially the same as the "conversion tool" options described above. The generator machine preferably runs its own HTTP proxy (the "translator HTTP proxy") to cache various inputs and outputs, together with a translator process (described below) that accepts requests (e.g., from a localhost connection to the translator HTTP proxy) and generates IF based on data retrieved from the HTTP proxy via an associated cache process. In an alternative, the translator process may comprise part of the translator HTTP proxy, in which case IF generation takes place within the proxy. Fragment generation may also be carried out in an edge machine HTTP proxy or even further downstream (into the Client itself), such as where a Client maintains a session connection with one or more peer clients.

Figure 4:
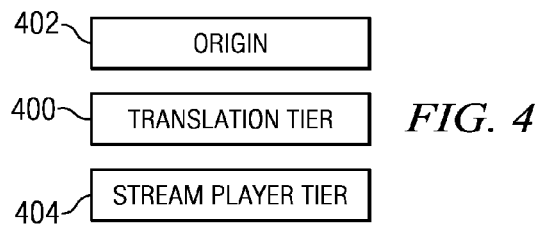
FIG. 4 shows an alternative embodiment of the content delivery architecture in FIG. 3.

An architecture and request flow of a VOD approach is shown in FIG. 4. In this embodiment, a translation tier 400 is located between an origin 402 (e.g., customer origin, or the Storage subsystem, or both) and the stream player tier 404. In a representative embodiment, the translation tier executes in its own portion (e.g., a Microsoft IIS or equivalent network) within the CDN, preferably in a Region dedicated to this purpose. Alternatively, a translator (as described below) may run on a subset of HTTP-based edge machine Regions.

Figure 5:
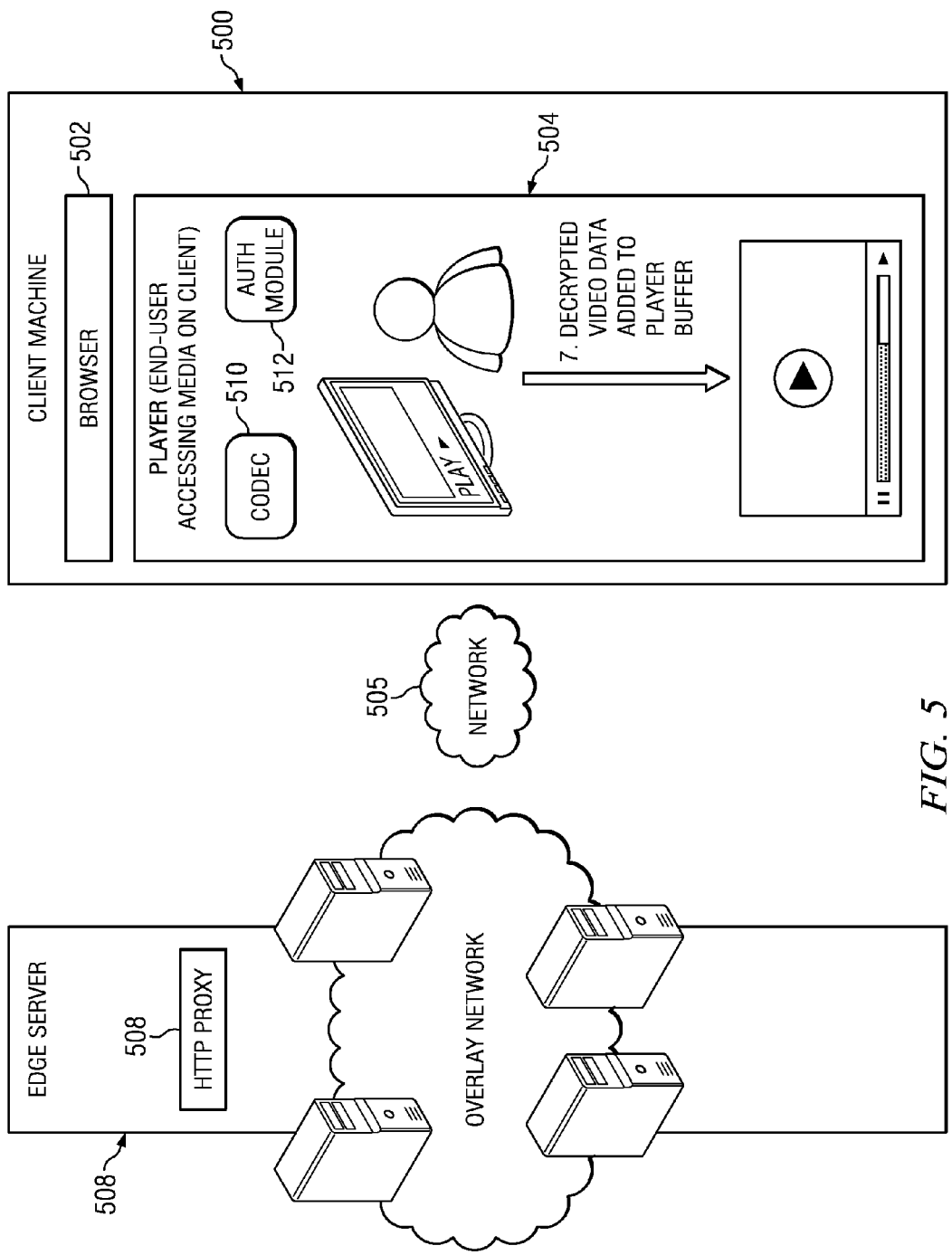
FIG. 5 illustrates an edge server-client browser interaction over which the protection technique of this disclosure operates.

The above-described embodiments provide a format-agnostic streaming architecture that utilizes an HTTP edge network for object delivery. The edge network may include one or more security mechanisms. In a representative implementation, as seen in FIG. 5, it is assumed that an end user machine 500 has an associated client browser 502 and a media player 504. Content to be rendered by the media player is deliverable over network 505 to the end user machine from an edge server machine 506 running an http proxy process (sometimes referred to herein as "ghost") 508, such as described above. As will be described in more detail below, the proxy has the capability of encrypting the content, preferably under metadata control. The player comprises a player component 510 (one or more codecs) and a security module (the AUTH module) 512. This module includes cryptographic hashing and encryption methods for the purpose of identifying the running player, and securely communicating the results to an edge server. The AUTH module preferably is a renewable player side plugin that allows for a change in the hash-computing algorithm (KDF) in real-time, without requiring any player patch to the player runtime. The AUTH module, in the alternative, may be integral with the other player code. As a security mechanism, the player code may be subject to a "player verification" operation, which provides a means for the edge server (more generally, the edge network) to verify the player implementation. Player verification prevents unauthorized players from playing protected content (typically through deep linking attacks). A player verification mechanism ensures that a player and, optionally, its resident AUTH module, are authentic. This is typically achieved by hashing (e.g., using MD5, SHA-1, or the like) the player and AUTH module to produce a message digest for verification by the edge server. The player verification scheme also may test (periodically) the running image (on the client) for the presence of a security code, and it may obfuscate the AUTH module. In addition, the edge network typically enforces an edge "token authorization" (or token auth) scheme that provides verification of end-user credentials and transfer of access control. Token authorization, as is well-known, uses a server-generated hash of session information and access control parameters. The server transfers a token to the player either in a URL query string or a cookie. A token authorization scheme works to mitigate link sharing or hijacking attacks.

While token authorization and player verification provide useful advantages, it may be desired to provide additional content protection mechanisms. One such technique, which is the subject of this disclosure, is now described.

Extending Confidentiality into a Player

The above-described network typically uses SSL to protect content as it streams from an edge server ghost process to the player application resident in the browser. This use of SSL, while effective for E-commerce, was not designed to protect application data of interest from attack by the end user. Thus, data passing through memory on the end user's browser is unprotected. While there are exceptions, most browsers today do not include secure memory or processors to offload the decryption of streamed multimedia data. In addition, any application capable of handling an anonymous SSL/TLS session can impersonate a legitimate browser for the single purpose of making unauthorized copies. To make matter worse, even legitimate browsers are allowed to cache decrypted data to non-volatile storage, leaving copies readable by any user with browser access.

Thus, premium content owners are facing a huge challenge in securing their content from stealing by hackers while it is being delivered to end user client systems or while it is at rest on client systems. Content delivered as part of progressive media download is exposed in cache or disk even if it is delivered over SSL, as SSL terminates at the browser leaving the content exposed in the cache. Premium content delivered to player runtime needs to be protected all the way to runtime and while in cache or disk. The approach described herein encrypts the content all the way to player runtime and provides an alternative to customers who do not require a full DRM solution and its overhead, but still need to prevent content to be accessed from unauthorized access while it is in transit or at rest.

The technique described herein extends data confidentiality into the player application to fend off scalable attacks against the delivery service. The basic technique works as follows. In response to a request for a content segment received by a server, the server generates and associates with the segment a special message that confers entitlement to a session-specific key from which one or more decryption keys may be derived. The decryption keys are useful to decrypt the segment at runtime as it is about to be rendered by a player. Before delivery, the server encrypts the segment to generate an encrypted fragment, and it then serves the encrypted fragment (and the message) in response to the request. At the client, information in the message (typically, a token-protected URL) is used to obtain the session-specific key. Using that key, the decryption keys are derived, and those keys are then used to decrypt the received encrypted fragment. The decryption occurs at runtime. The approach protects content while in transit to and at rest in the client browser environment.

Preferably, and as will be described, the approach uses aspects of symmetric key encryption, ephemeral keying (Session Key), HMAC-based key derivation, AUTH module (as defined below) binding, and code obfuscation to protect content from stream rippers and copy of data at rest. This solution moves the content protection scheme into the player application, maintaining encryption to the point of playback. When content owner requirements do not call for a DRM, this approach provides a protection solution that allows customers to monetize content with an affordable, lightweight deterrent to theft and misuse of content. Specifically, the approach protects against: scalable attacks against the delivery service, scalable attacks against the encryption key, scalable last-mile content tampering, transport level content decryption, and copy at rest in cache. Unlike a traditional DRM system, the approach need not support the specification of policy, or support for offline access. Instead, through the use of conditional access parameters, individual access requests are granted or denied when the client begins playback. When granted access, the player deciphers a set of bytes that are uniquely protected for the player's security module.

By using a combination of configurable security elements in this manner, the player security module accepts messages in the content stream that provide the instructions needed to decrypt the payload. As will be described, these messages are used to produce the keys that protect the clear text content. The message format supports group, per session, and shared keying, along with basic payload encryption (e.g., for certain media formats such as Adobe® Flash®) and container encryption (e.g., for certain other media formats, such as Microsoft® Silverlight® and Apple® iOS®). Unlike a DRM scheme, however, the messages themselves need not contain keys and they need not carry policy information. Instead, preferably the messages confer entitlement through conditional access to a session-specific key referenced through a URL in the message. In this way, access to the session key requires a valid edge authentication token, preferably for each segment of content. Along with certain control words, which are allowed in protected portions of the message, the technique allows the system to switch keys more frequently, incurring lower risk of prolonged breach. This is provided through the use of a set of renewable key derivation functions and metadata configuration parameters.

The secure media content protection mechanism of this disclosure protects against eavesdropping content en route to the player. If desired, end-to-end encryption (such as via SSL) may be used to protect data from the server egress to the client browser. This encryption prevents network packet captures from separating the content from the player to which it is directed.

Figure 6:
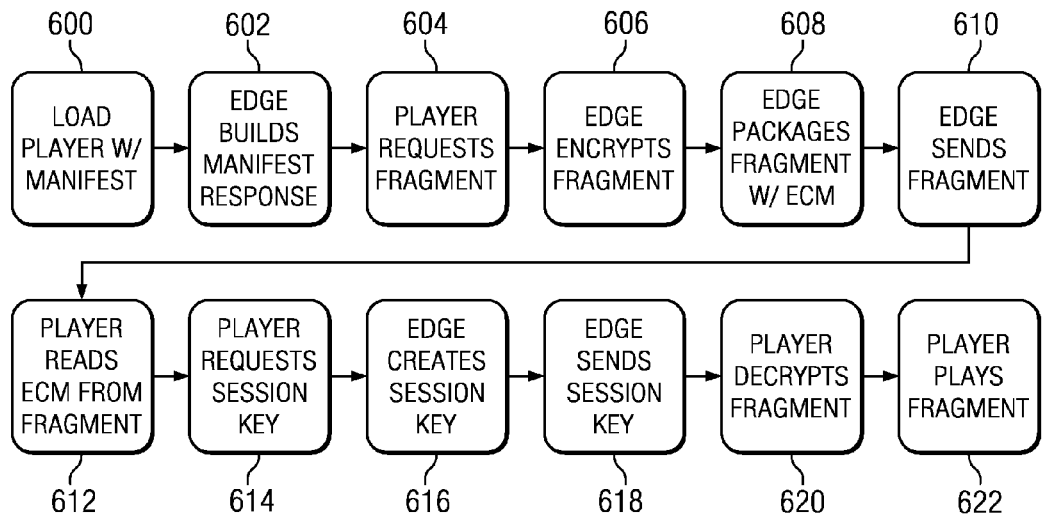
FIG. 6 illustrates a preferred operation of the secure media protection technique of this disclosure.

FIG. 6 illustrates the basic approach. At step 600, the player is loaded, typically within the client browser or other rendering engine, and makes a request for a content manifest to an edge server running an http proxy (ghost) provisioned to provide the desired functionality. At step 602, the http proxy that receives the request performs an authorization check; if the check passes, the proxy builds and serves back to the requesting player a response that includes the manifest. The player then reads the manifest and requests a first fragment of the desired content. This is step 604. Typically, a "fragment" represents a time slice of contiguous video and audio data of a configurable length, at a discrete bit rate. The player request (generated at step 604) is received by the edge server http proxy. The edge server performs another authorization check; if the check succeeds, the edge server proxy encrypts the fragment. This is step 606. At step 608, the edge server proxy packages the encrypted first fragment with a message, referred to as an entitlement control message (ECM); as will be seen, this message is used to provide instructions needed to decrypt the remaining payload (namely, the video and/or audio content). In particular, the message is used to produce the keys that protect the clear text content; the ECM, however, need not include the actual keys. Rather, the ECM confers entitlement through conditional access to a session-specific key, preferably references through a URL in the message. (Although not required, preferably the manifest and content fragment links (URLs) are token-protected). At step 610, the edge server proxy serves the encrypted fragment (with the ECM packaged therewith). At step 612, the player reads the ECM from the fragment. The player then makes another request to the edge server proxy to request the session key. This is step 614. At step 616, the edge server proxy performs another authorization check; if that check passes, the edge server creates the session key. The session key is sent to the client at step 618.

At step 620, the player decrypts the fragment and, at step 622, the player plays (renders) the fragment. This completes the basic operation.

Figure 7:
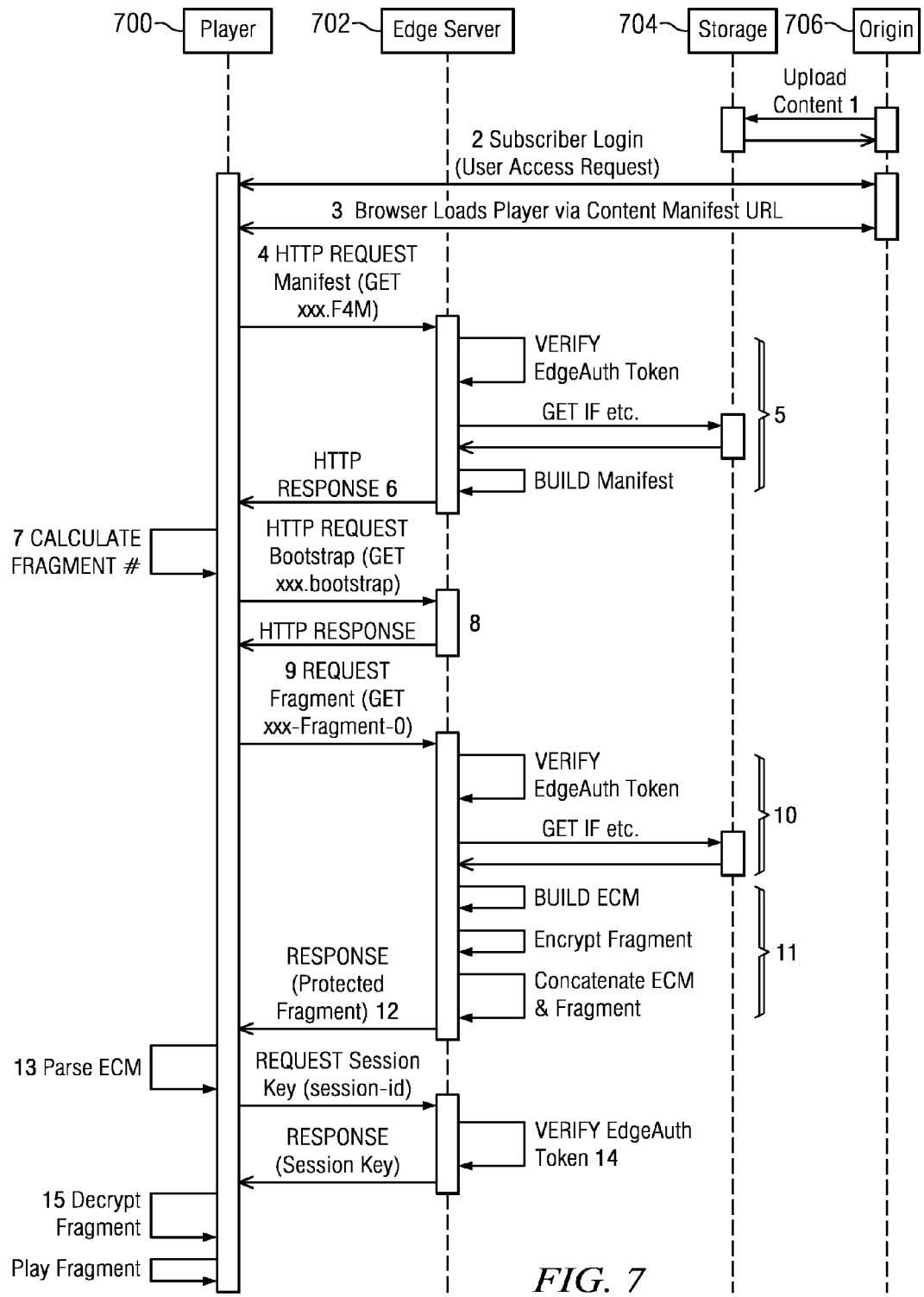
FIG. 7 is a UML diagram illustrating the various steps of the technique.

FIG. 7 is a UML diagram illustrating the basic operation of the above-described scheme for a Flash-based player. In this diagram the Flash player 700 interacts with the edge network server proxy 702 (Ghost). The content itself may be available from an edge network data storage system 704 (NetStorage) after having been uploaded there by the content provider 706 (Content Website). Step 1 uploads the content to the service provider. Step 2 facilitates the token authorization, and step 3 may involve player verification. Steps 4-15 correspond to the secure media protection scheme previously described.

ECM and Keys

The following terms have specific meanings in the context of this document.

Ephemeral Key: A key that is temporal in nature.

Session Key: An ephemeral value used to derive one or more encryption keys.

Content Encryption Key: An ephemeral key used to protect a temporal instance of the program data. This key is derived from the Session key by means of a key derivation function.

ECM Encryption Key: An ephemeral key used to protect the ECM structure. This key is derived from the Session key by means of a key derivation function.

Entitlement Control Message (ECM): A data structure used to deliver access criteria and encryption parameters from q server/head-end to q client/player.

Conditional Access: A means of controlling access to a protected resource based on subscriber/user entitlement status at the time of playback.

Generally, the technique involves content encryption rooted in a renewable security module (AUTH) that executes in or in association with the player. The technique also features lightweight conditional access functionality through a form of entitlement control messaging, payload encryption, and key management. Preferably, control messages in this implementation are carried in a data structure that is versioned and used to carry CDN-specific access criteria (encryption parameters) to the AUTH module. Preferably, each entitlement control message (ECM) is muxed with the content it protects, and it is further protected in such a way that only a provisioned player that is entitled to access the content is allowed to decrypt and play the stream.

The major parts of the system are included in the following features of the edge server ghost process and a player AUTH module.

Figure 8:
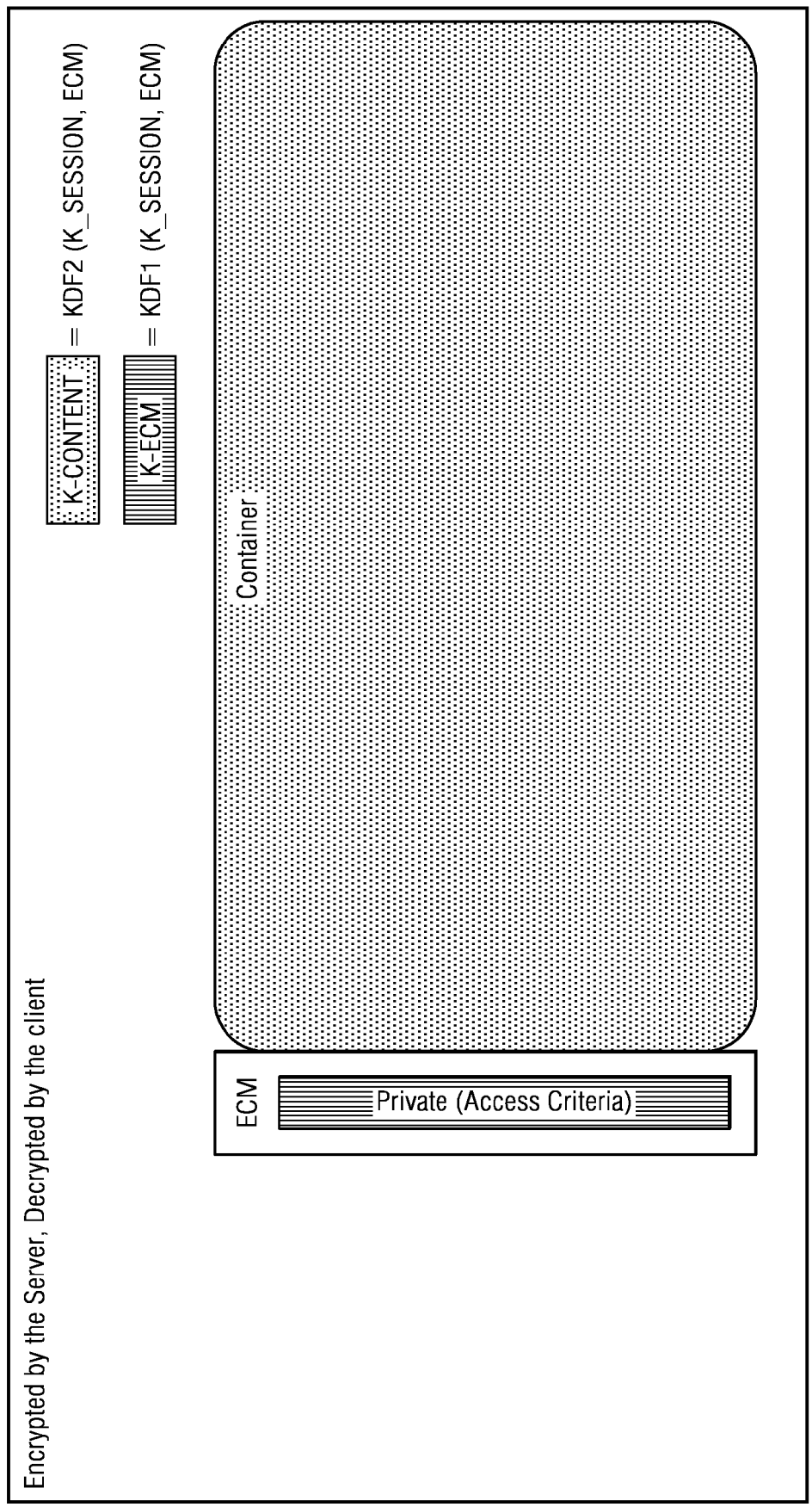
FIG. 8 illustrates a first "payload encryption" embodiment showing how the ECM message is packaged.
Figure 9:
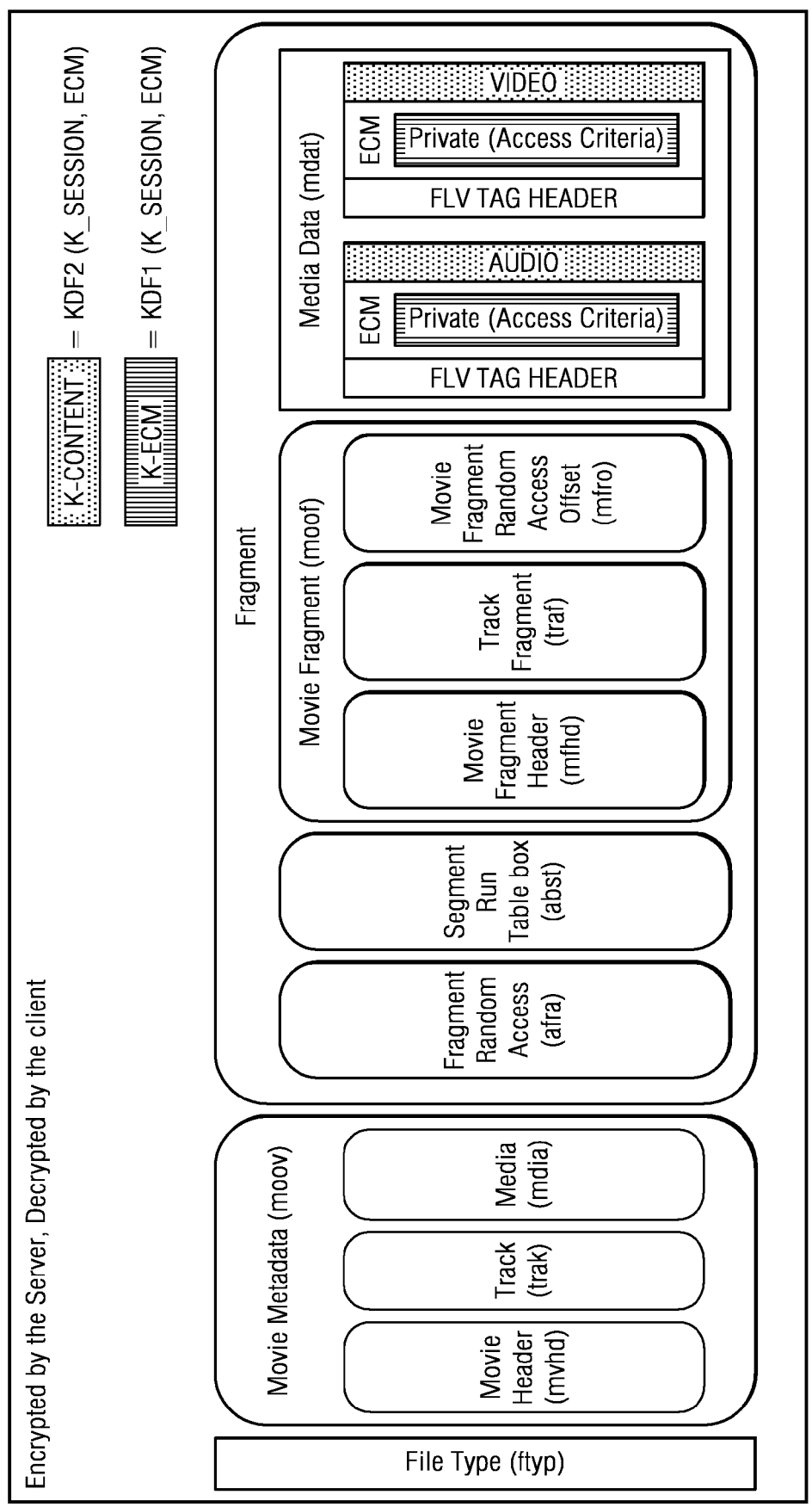
FIG. 9 illustrates a second "content encryption" embodiment showing how the ECM message is packaged for segmented data.
Figure 10:
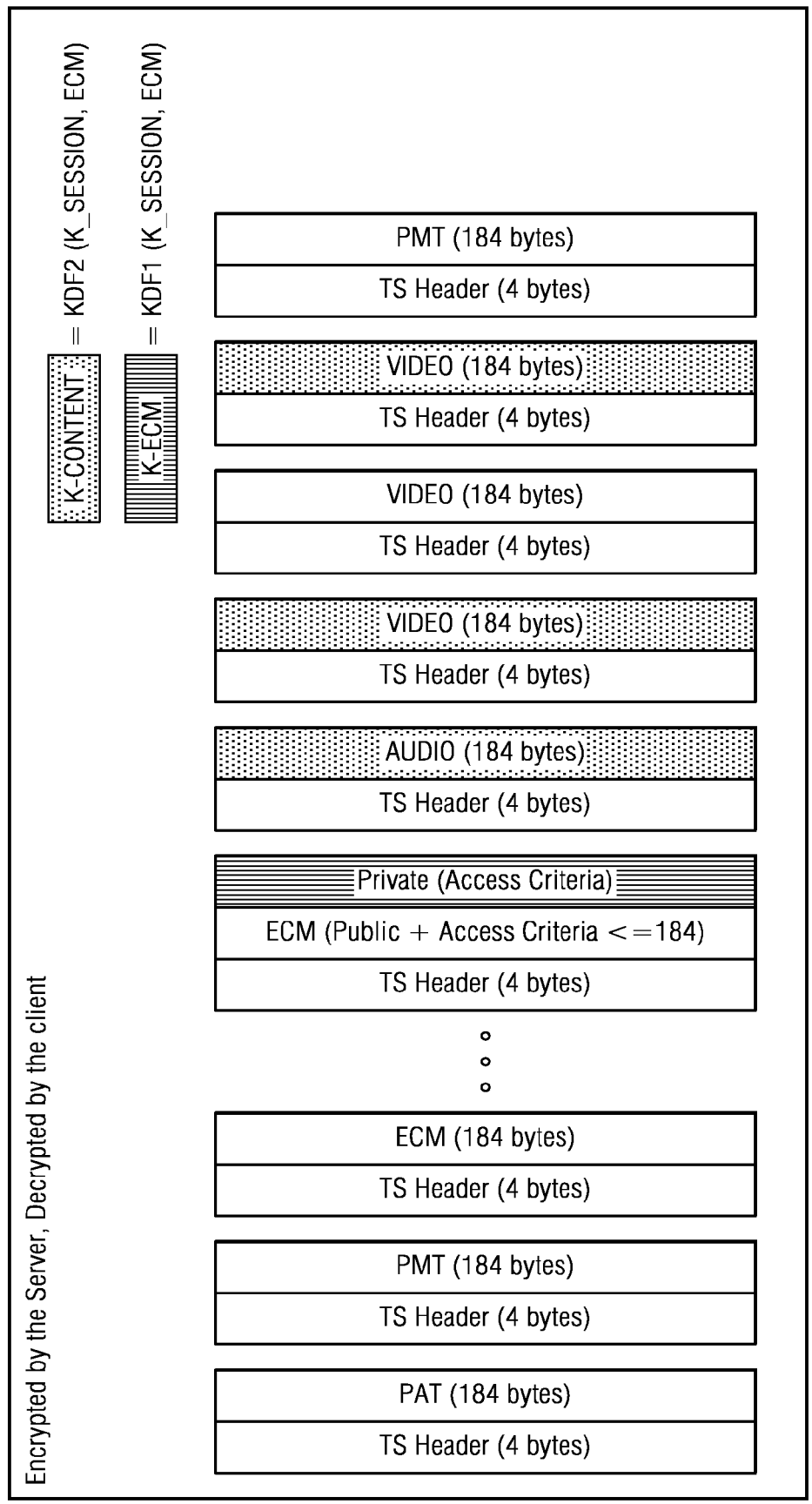
FIG. 10 illustrates a third embodiment showing how the ECM message is packaged for MPEG2 Transport Streams.

Content Scrambling (GHost and Player AUTH)
Entitlement Control Message (ECM)
Payload Encryption
Container Encryption
Key Management Service
Server (GHost)
  Key Management: Session Key Generator
  Encryption configuration meta data
  Key Derivation Functions
  Session Management
Client (Player AUTH)
  Request for Session Key
  Key Derivation Functions As described above with respect to FIG. 6 or FIG. 7, content requests are handled by the edge server ghost process which, for some forms of content, returns a file describing the segments needed for a VOD file or live event. Each segment represents a time slice of contiguous video and audio data of a configurable length, at discrete bit rates. When the player is ready to begin playback, it requests a fragment of the file, as identified in the manifest, and then awaits a response with the requested data. When the technique of this disclosure is enabled, the ghost process prepares an ECM and, per configuration metadata, encrypts the response for delivery to the player. Depending on the mode of operation, the ECM may be placed within the media container (Payload Encryption), delivered out-of-band, or prefixed to the encrypted fragment (Content Encryption). Payload encryption scrambles the sensitive codec data, leaving information surrounding the data of interest in the clear. This approach is shown in FIG. 8. Preferably, the ECM is inserted immediately ahead of the data it protects, using spatial alignment to synchronize ECM with the scrambled data. For segmented data, such as Adobe Flash, preferably the ECM is inserted into a custom header that follows the FLV tag header, but precedes the first byte of encrypted data. This approach is shown in FIG. 9. For native MPEG2 Transport Streams, preferably the ECM resides in a separately muxed transport stream (TS) program using a packet id (PID) defined in a program map table (PMT). This approach is shown in FIG. 10. Scrambled packets typically have the Transport Scrambling Control bits of the TS header set appropriately. Container encryption treats the data as an opaque blob to which it prefixes and ECM. In this mode, preferably all container information is scrambled along with the program data (audio/video).

Figure 11:
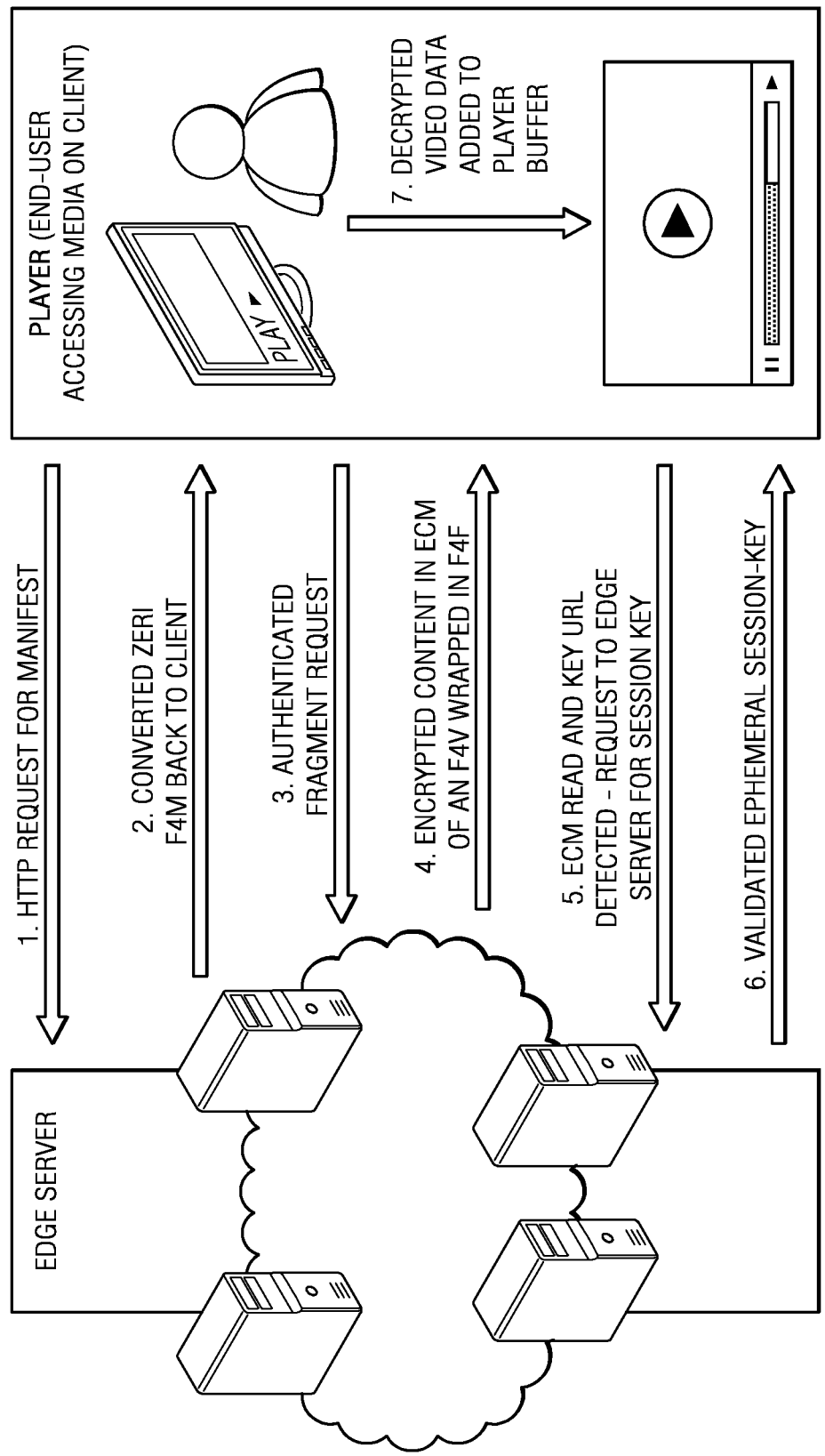
FIG. 11 illustrates an embodiment for HTTP dynamic streaming for use in an Adobe® Flash® runtime environment.

FIG. 11 illustrates an embodiment for HTTP dynamic streaming for use in an Adobe® Flash® runtime environment. This embodiment is merely representative.

To facilitate encryption key management, in one embodiment the edge server ghost process uses unique ephemeral keys for each fragment of content delivered to the client. Both the keys and the content preferably come from the same instance of the ghost process, and encryption session state preferably will be stored locally. To protect against access abuse, an edge tokenization may be used, along with SSL/TLS to protect confidentiality during the actual transport (from edge server to client).

When a player initiates a segment request, the ghost process that receives the request creates an encryption session object to store ephemeral keys and other session context information needed to track encryption state. These encryption session objects are then stored in an internal session table, keyed by a session-id string, and retained until the end of the session or timeout. Preferably, session objects have a limited lifespan and will naturally induce a renegotiation of the session key. If the player shares its session id with some other user, token authentication may be used to limit abuses of concurrent access.

As the client parses the ECM, it encounters a URL to the Session Key. This URL typically points to an https resource, and it preferably includes a short-lived edge authentication token to protect the resource against a few common forms of unauthorized access.

Within the player, the AUTH module is responsible for parsing the ECM, downloading the appropriate keying material, decrypting the data and passing it to the codec for playback. Preferably, the AUTH module includes a number of key derivation functions which, when given a session specific Session Key, produce the set of keys needed to decrypt and verify data integrity. Preferably, this module is dynamically loaded code that is or can be downloaded to the client separately from the player. This module may be cloaked using obfuscation, and in some cases, can be changed within moments of a breach. Any modification of this module induces a change in the player verification signature and player boot process.

Key derivation functions are a building block of many cryptographic systems. Given the lack of strong mutual authentication between the client and server, and the absence of trusted storage on the client, sharing content keys between client and server is undesirable. To mitigate the risks involved with key exchange over an insecure channel to the untrustworthy client, the described technique preferably uses an HMAC key derivation function with obfuscated secrets that, when given the session key (K_SESSION) and other parameters, can compute either the ECM key (K_ECM), the content key (K_CONTENT) or the HMAC salt (SALT). The KDF implementation chosen is the HKDF found in Internet RFC 5869.

A preferred implementation (FIG. 8 through FIG. 10 for various embodiments) defines three functions (KDF1, KDF2, and KDF3) that take the session key and ECM data. KDF1 and KDF2 are used to derive K_ECM and K_CONTENT, and KDF3 is used to derive SALT for the HMAC.

The preferred approach of this disclosure uses a combination of content scrambling, key management, and configuration metadata to enable a lightweight protection scheme for HTTP capable clients. In this section, the basic requirements of content scrambling are established, the Entitlement Control Message is described in detail and payload encryption is tied together with this structure.

In most content protection schemes the data of interest (audio/video) and the access control information (access criteria) are stored separately. While the implementation of access criteria may vary from one scheme to the next, most include a reference to the encryption key, specific decryption control words/instructions and, in some cases, policy and parental controls such as rating/morality level. Depending on how the access criteria are protected, the rights they convey, and how they are delivered, the relevant information may be stored in one of a DRM license, an ECM, a manifest or an index/playlist (m3u8) file. The choice of which scheme to use varies with content rights, runtime requirements and player capabilities. In general, DRM licenses are the most full featured implementation, followed by the ECM, with manifest and index files being the least common in monetized content distribution. Factors influencing the decision making process include perceived value of the content, support for offline playback, hardware support (TPM, secure decode path, secure key ladder, secure id, other), and content owner requirements. The ECM traditionally offers fewer features than a DRM license, at a seemingly lower degree of overall complexity. At the same time, the ECM offers resource control to the granularity of the message spacing interval, while taking fewer resources to generate and consume.

As noted above, the Entitlement Control Message, or ECM, is a data structure used to deliver access criteria and encryption parameters from the server/head-end to the client/player. Preferably, this message is included in full with the first response, and repeated in an abbreviated form during the session. When the client is authorized to play the stream, it acquires the Session Key identified by the ECM, derives the necessary protection keys (K_ECM and K_CONTENT) and begins decryption. Preferably, the Entitlement Control Message is split into two halves. The first half is accessible to the public and contains information the client uses to obtain the Session Key, and derive the protection keys. The public section of the structure begins with a version field, followed by a 4 bit message type, a 16 bit KDF version, a 128 bit initialization vector and ends with a variable length null-terminated URL string. The second half of the ECM is encrypted using K_ECM, and it contains parameters used to decrypt the media payload data. The private section of the ECM is decrypted using K_ECM, using a cipher of type specified in 4th bit of the ECM message type, passing the first byte of the encrypted CRC16 through the last byte of the encrypted HMAC as input to the decryption method.

Preferably, every encrypted segment of data will include an ECM. The first response to every request for encrypted data will include an ECM with public and private sections, as well as a URL to a unique Session Key. The described approach grants the player conditional access to the Session Key based on validation of the edge authentication token and the result of any supported origin based authentication. Alternative implementations may include support for SAML delegation for integration with the DECE, or OAUTH and other SSO technologies for federation with vertical applications.

Encryption parameters from configuration metadata, and other server information, are copied into the ECM by the server and read from the ECM by the client. The client is responsible for obtaining the appropriate Session Key, loading the correct authentication module, and deriving K_ECM needed to decrypt 'access criteria' located in the private section of the ECM.

In payload encryption mode, only the audio and video data within the media data (MDAT) box is encrypted. Payload encryption requires additional parsing during encryption and decryption, but fewer total bytes are encrypted per unit. In container encryption mode, all of the bytes from the input media fragment are encrypted, and the ECM is then prefixed to the beginning of the HTTP response. In this mode of operation both the payload (video/audio elementary stream data) and the surrounding data are encrypted without regard for type. The advantage of this mode is that it does not require complex parsing, subsequently simpler to develop and maintain.

There are a variety of ciphers to select from for the encrypted data. The most appropriate choice will require a tradeoff between the desired strength of the cipher, the temporal nature of the data, and throughput requirements. In one embodiment, the cipher is AES, although this is not a limitation, as the implementation supports any cipher that fits within the runtime environment of the client and server.

Preferably, for every segment, a unique K_ECM and K_CONTENT are derived using the corresponding KDF, the working Session Key and additional information contained in the ECM. This helps to avoid the well-known attack, produces a steady stream of new keys and enables random access to segments using an infrequent download of the session key.

A Key Management Service (KMS) provides an interface to the key derivation functions. It contains routines to generate a Session Key, derive protection keys, retrieve message authentication code SALT, and verify the HMAC of a given message. As noted above, preferably the information generated on the server side is protected by token authentication and referenced using server side session objects. The server implementation of KMS preferably generates strong random numbers, and it provides functions to transform the Session Key into an ECM Key, a Content Encryption Key or SALT. The client implementation of KMS preferably supports key derivation and an HMAC verifier, and it is implemented within the Client AUTH Module, and it is loaded at runtime through dynamic loading.

Each above-described process preferably is implemented in computer software as a set of program instructions executable in one or more processors, as a special-purpose machine.

Representative machines on which the subject matter herein is provided may be Intel Pentium-based computers running a Linux or Linux-variant operating system and one or more applications to carry out the described functionality. One or more of the processes described above are implemented as computer programs, namely, as a set of computer instructions, for performing the functionality described.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. A given implementation of the present invention is software written in a given programming language that runs in conjunction with a DNS-compliant name server (e.g., BIND) on a standard Intel hardware platform running an operating system such as Linux. The functionality may be built into the name server code, or it may be executed as an adjunct to that code. A machine implementing the techniques herein comprises a processor, computer memory holding instructions that are executed by the processor to perform the above-described methods.

While given components of the system have been described separately, one of ordinary skill will appreciate that some of the functions may be combined or shared in given instructions, program sequences, code portions, and the like.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

Having described our invention, what we now claim is as follows.

The invention claimed is:

1. An apparatus associated with an edge network, comprising:
a processor;
computer memory holding computer program instructions executed by the processor to perform content protection, the computer program instructions comprising:
program code operative in response to a request for a segment of content to generate and associate with the segment a message that includes a first public portion and a second private portion, the first public portion holding a token-protected URL that confers entitlement by a client player to a session-specific key, the second private portion holding a cryptographic parameter encrypted with the session-specific key;
program code operative to encrypt the segment of content to create an encrypted fragment;
program code operative to serve the encrypted fragment and the message in response to the request;
program code operative to receive a request for the session-specific key, the request for the session-specific key having been issued by the client player following parsing by the client player of the message for the segment;
program code operative to generate the session-specific key; and
program code operative to return the session-specific key to the client player to enable the client player to derive one or more decryption keys as the segment is being rendered by the client player.

2. The apparatus as described in claim 1 wherein the message is associated with the segment of content by one of: placement within a media container, placement within a customer header preceding a first byte of encrypted fragment, and by placement in a distinct transport stream.

3. The apparatus as described in claim 1 wherein the session-specific key is an ephemeral key.

4. The apparatus as described in claim 1 wherein the encrypted fragment and the message are served to the client player over an SSL connection.

5. The apparatus as described in claim 1 wherein the segment of content represents a time slice of contiguous video and audio data of a configurable length at a discrete bitrate.

6. An apparatus associated with a client machine, comprising:
a processor;
player code;
computer memory holding computer program instructions executed by the processor as a security module that executes in association with the player code, the computer program instructions comprising:
program code operative to generate a request for a segment of content;
program code operative to receive from a server an encrypted fragment, the encrypted fragment having a message associated therewith, the message conferring entitlement to a session-specific key, wherein the message includes a first public portion, and a second private portion, the first public portion holding a URL to the session-specific key, and the second private portion holding a cryptographic parameter encrypted by the session-specific key;
program code operative to use information in the message to issue to the server a request to obtain the session-specific key;
program code operative to receive from the server the session-specific key, the session-specific key having been generated at a server in response to receipt at the server of the request to obtain the session-specific key;
program code operative to derive, from the session-specific key, one or more decryption keys; and program code operative to decrypt, using the one or more decryption keys, the received encrypted fragment, the decryption occurring as the segment is rendered by the player code.

7. The apparatus as described in claim 6 wherein the encrypted fragment and the message are received by the client player over an SSL connection.

8. The apparatus as described in claim 6 wherein the segment of content represents a time slice of contiguous video and audio data of a configurable length at a discrete bitrate.

9. The apparatus as described in claim 6 wherein the session-specific key is an ephemeral key.

* * * * *